Figure 1:
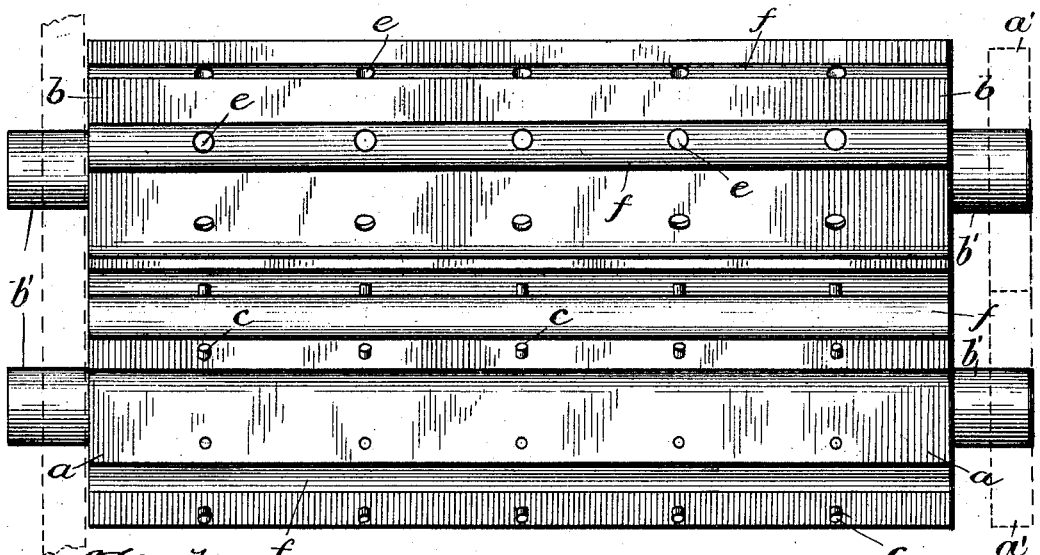

No. 770,888. PATENTED SEPT. 27, 1904.
B. R. BENJAMIN.
HUSKING ROLLS.
APPLICATION FILED NOV. 29, 1902.
NO MODEL.

Witnesses:
J. M. Wrenn
E. C. Schuermann

Inventor:
B. R. Benjamin
By his attys.
Peirce & Goldsborough

No. 770,888. Patented September 27, 1904.

UNITED STATES PATENT OFFICE.

BERT R. BENJAMIN, OF CHICAGO, ILLINOIS, ASSIGNOR TO INTERNATIONAL HARVESTER COMPANY, OF CHICAGO, ILLINOIS, A CORPORATION OF NEW JERSEY.

HUSKING-ROLL.

SPECIFICATION forming part of Letters Patent No. 770,888, dated September 27, 1904.

Application filed November 29, 1902. Serial No. 133,212. (No model.)

*To all whom it may concern:*

Be it known that I, BERT R. BENJAMIN, a citizen of the United States, residing at Chicago, county of Cook, State of Illinois, have invented certain new and useful Improvements in Husking-Rolls; and I do hereby declare the following to be a full, clear, and exact description of the invention, such as will enable others skilled in the art to which it appertains to make and use the same.

The general object of the invention is to provide a construction of rolls that will strip the husks from the ears without shelling the corn or mutilating the ears.

More especially the object is to construct the rolls so that they will have a differential action on the ears—that is to say, one of the rolls is constructed and adapted to have an aggressive action, while the action of the other is passive, merely supporting the ears in the early part of the husking operation. The aggressive roll seizes the husks and does the preliminary part of the stripping operation, after which both rolls coöperate equally and in the usual manner to complete the separation and detachment of the husks from the ears. Heretofore these rolls have usually been constructed so as to coöperate equally in seizing the husks, the result being that the ears are pulled down between the flutes of the rolls to such an extent that they are sometimes mutilated and some of the corn is frequently shelled.

It is characteristic of the present invention that the husks are first seized entirely by one of the rolls and that the action of the other roll is passive until the husks have been split open and sufficiently torn apart to permit them to be pulled clear away from the ears by the conjoint action of the two rolls without danger of injuring the ears.

With this object in view the invention consists in making one of the rolls with plain surfaces which offer little or no resistance to the ears and providing the other roll with teeth, pins, or other aggressive means to seize the husks and pull and tear them apart. The ears rest principally on the plain surfaces of the one roll, and when the pins or teeth of the other roll seize the husks the ears are free to turn, roll, or move away, and under the first impact of the teeth they yield either by moving bodily away or by turning or rolling over. When, however, the husks are pulled open or torn apart sufficiently to enable the coöperating flutes of the two rolls to seize them, the usual conjoint action of the rolls comes into play, and the complete detachment of the husks from the ears is effected without injury to the ears or shelling the corn, the plain surface of the roll permitting the ears to move away from the other roll not only at the first impact of the husking-pins, but at any other when there is any particular liability to draw the body of the ears between the rolls and mutilate them, which may even occur during the latter part of the husking operation when the husks are being finally torn from the butt of the ears.

The construction is illustrated in the accompanying drawings, wherein—

Figure 2:
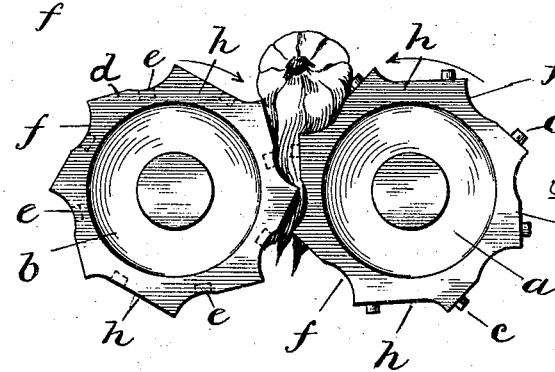
Figure 3:
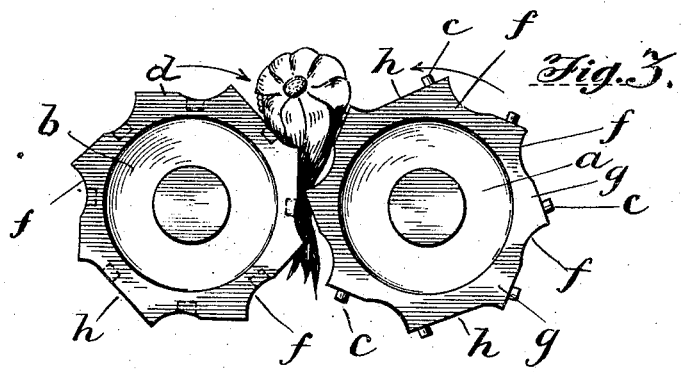

Figure 1 is a top plan view of a pair of rolls constructed in accordance with my invention. Fig. 2 is a end elevation of the same, showing an ear of corn in position to be husked; and Fig. 3 is a similar view showing the manner in which the ear yields away from the aggressive roll when the rolls have turned somewhat beyond the position indicated in Fig. 2.

Referring to these views, *a* and *b* denote the individuals of a pair of fluted husking-rolls, which may be of any desired size and length and may be made out of any preferred material. These rolls are intergeared by means of the usual pinions *a'* (represented in dotted lines in Fig. 1) and rotate toward each other in the ordinary manner, as indicated by the arrows in Figs. 2 and 3. They are also provided with journals *b'* at opposite ends, by means of which they are mounted in suitable bearings *c'* in the machine. The framework of the machine is not herein illustrated, as the rollers are adapted to any sort of machine, and the framework forms no part of the invention and may be of the usual kind. The invention relates only to the construction of the rolls and is not concerned with the construction of any of the other parts of a husking-machine.

The roll $a$ is provided with rows of pins or teeth $c$, said rows being parallel with one another and the individual pins or teeth in the row being spaced at suitable distances apart. The rows of pins or teeth are preferably located, as best shown in Figs. 2 and 3, near the apex or ridge of the flutes of the roll on the side which is foremost as the rolls revolve, and in the operation of the rolls they constitute a husking element which has an immediate aggressive action on the ears, seizing the husks promptly on the delivery of the ears to the rolls and splitting and tearing them open and partly away from the ears, so as to permit them to be subsequently seized between the rolls and completely detached. The roll $b$ is fluted in the same way as the roll $a$; but instead of being provided with teeth or pins the surface of the flutes is plain and smooth, as shown at $d$, and they are preferably provided with recesses or depressions $e$, corresponding in position to the pins or teeth of the other roll and adapted to receive them when the surfaces of the two rolls come together. By reason of the fact that this roll has plain instead of toothed surfaces its action on the ear throughout the husking operation is passive as compared with that of the roll $a$—that is to say, as the flutes have plain surfaces although they tend to hold the ears up to the action of the other roll they do so in a manner to permit the ears to yield and move away from the aggressive roll, thereby preventing the ears from being caught between the rolls and injured or mutilated. Throughout the husking operation the plain surfaces of the roll serve more especially as supports for the ears until the husks have been sufficiently torn apart and away from the ears to permit the coöperating surfaces of the rolls to get a hold on them at such distance from the ears as to prevent the danger of the ears themselves being seized and mutilated. They also support the ears in a similar manner at the last stage of the husking operation and always permit them to yield to the action of the aggressive roll whenever the latter is liable to draw the ears down between the rolls.

The rolls $a$ and $b$ are geared together in the usual way, so that the apex of one flute comes opposite the plain part of the opposing roll between the flutes, and when the husks have been started in the manner above described these surfaces act together in the usual way and seize the husks and tear them clear off the ears. As here shown, the surface of the roll $a$ between the apexes of the flutes has preferably a shallow depression $f$ between the surface $g$, which carries the pins or teeth, and the rear side of the ridge of the flutes. It is not essential, however, that this construction be adopted, as this roll may be formed as to its flutes and intermediate surfaces in any preferred way. The surfaces of the roll $b$ have also these shallow depressions; but the construction may be modified without departing from the spirit or scope of the invention. As here shown, the surfaces of the roll $b$ are like those of roll $a$ except that they lack the aggressive element $c$. It will be noted that both rolls are shown as having flat surfaces $h$ at diametrically opposite points. These particular surfaces, however, have nothing to do with the operation of the rolls and are merely for the purpose of permitting the free drawing of the pattern out of the mold in the course of manufacturing the rolls.

Having thus described my invention, what I claim, and desire to secure, is—

1. A pair of revoluble fluted corn-husking rolls, one of said rolls being provided with means for aggressively seizing the husks, and the other having surfaces so inclined to radial planes as to permit the ears which are supported thereon to retreat from the aggressive roll and prevent the ears from being drawn in bodily between the rolls.

2. A pair of revoluble fluted corn-husking rolls, $a$, $b$, the roll $a$ being provided with teeth or pins $c$ for aggressively seizing the husks, and the roll $b$ having surfaces so inclined to radial planes as to permit the ears which are supported thereon to retreat from the roll $a$ and prevent the ears from being drawn in bodily between the rolls.

3. A pair of revoluble fluted corn-husking rolls, $a$, $b$, the flutes of one roll coöperating with the spaces between the flutes of the other roll, the roll $a$ having teeth or pins $c$ for aggressively seizing the husks, and the roll $b$ having surfaces $d$ so inclined to radial planes as to permit the ears which are supported thereon to retreat from the roll $a$, said roll $b$ having also recesses $e$ to receive the teeth or pins of the roll $a$.

In testimony whereof I affix my signature in presence of two witnesses.

BERT R. BENJAMIN.

Witnesses:
CHAS. N. CHAMBERS,
W. M. TWOMBLY.